March 10, 1953   W. A. ANDERSON   2,630,900
AUTOMATIC CARRIAGE RETURN CONTROL
Original Filed June 27, 1946   3 Sheets-Sheet 3
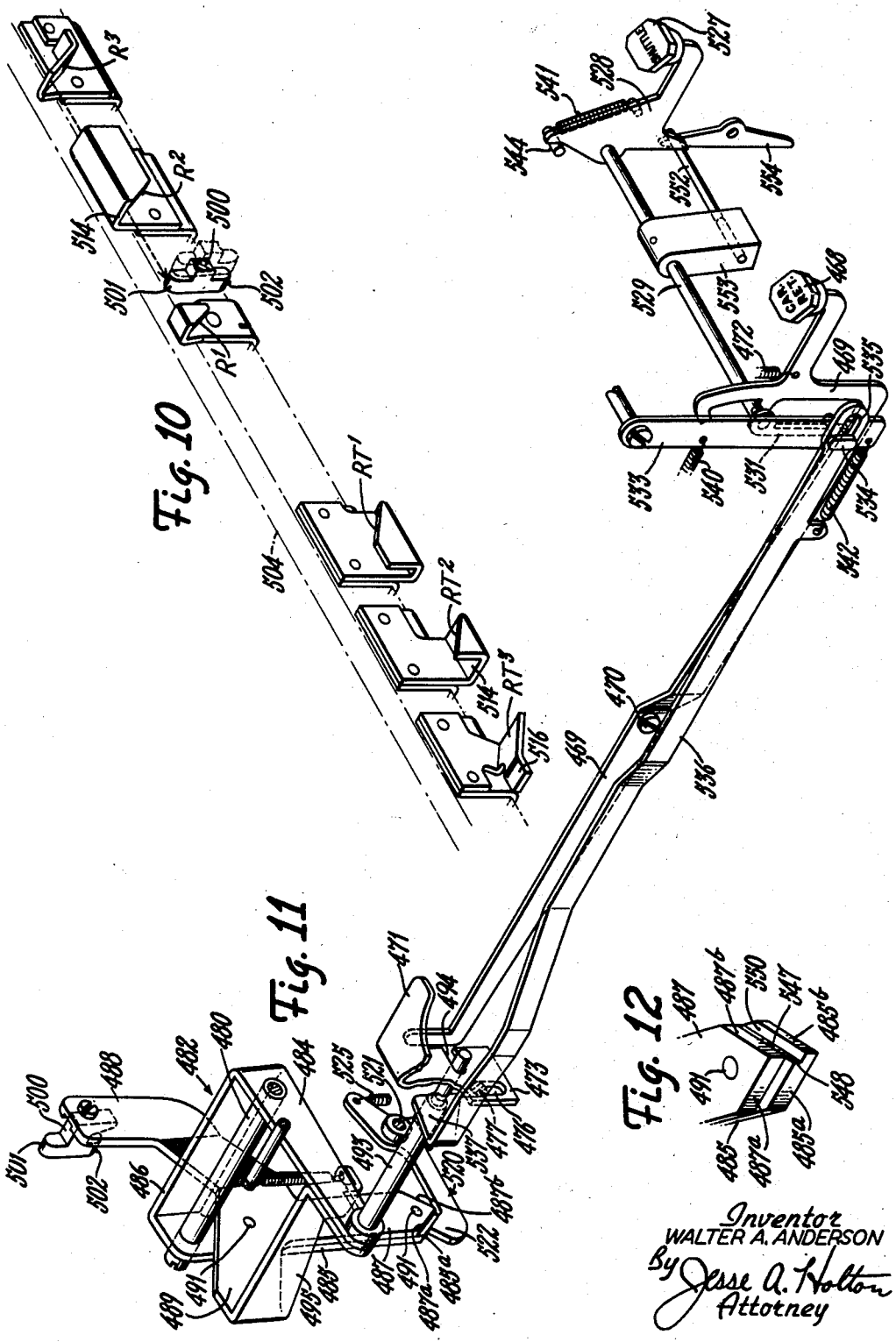
Inventor
WALTER A. ANDERSON
By Jesse A. Holton
Attorney Patented Mar. 10, 1953

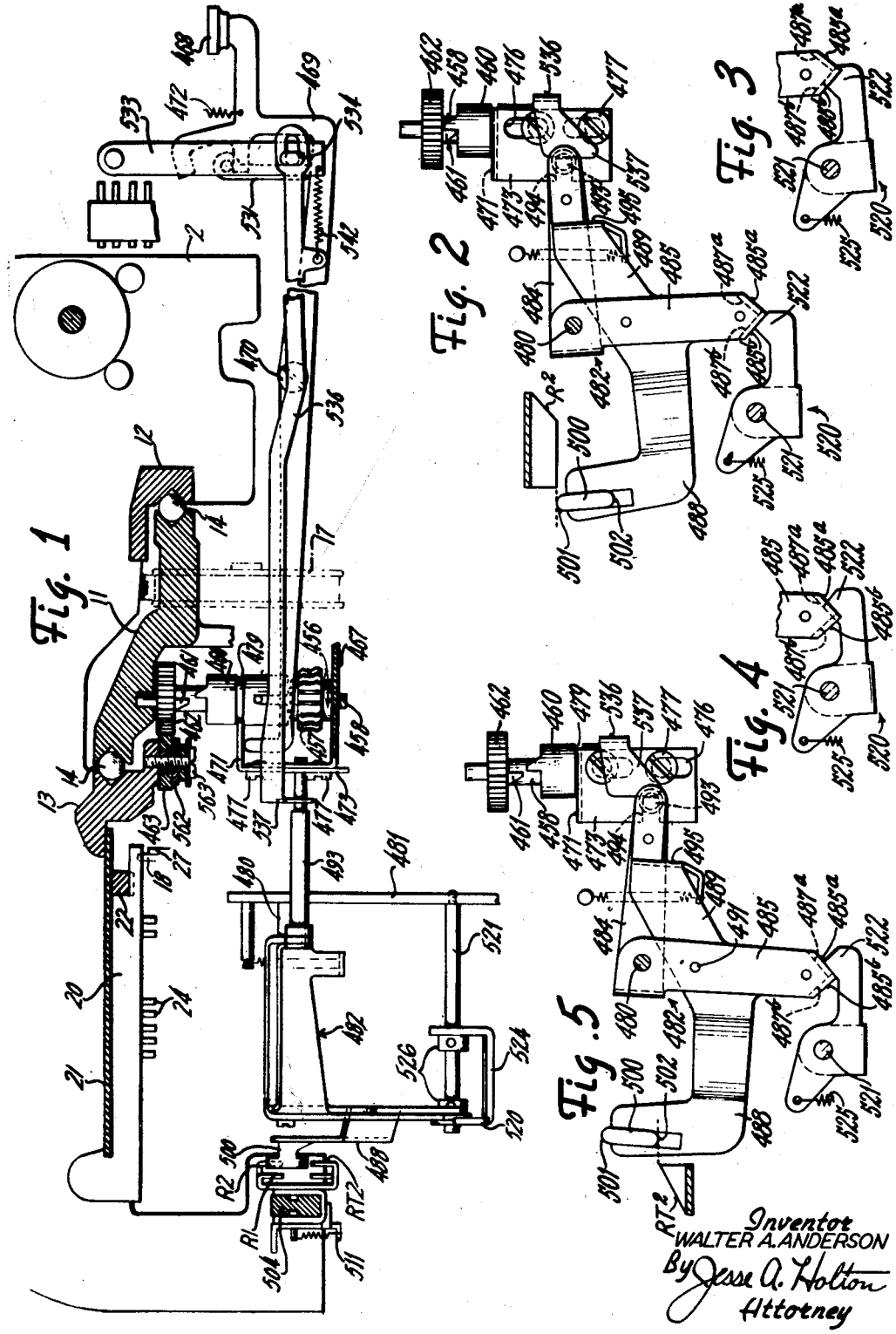

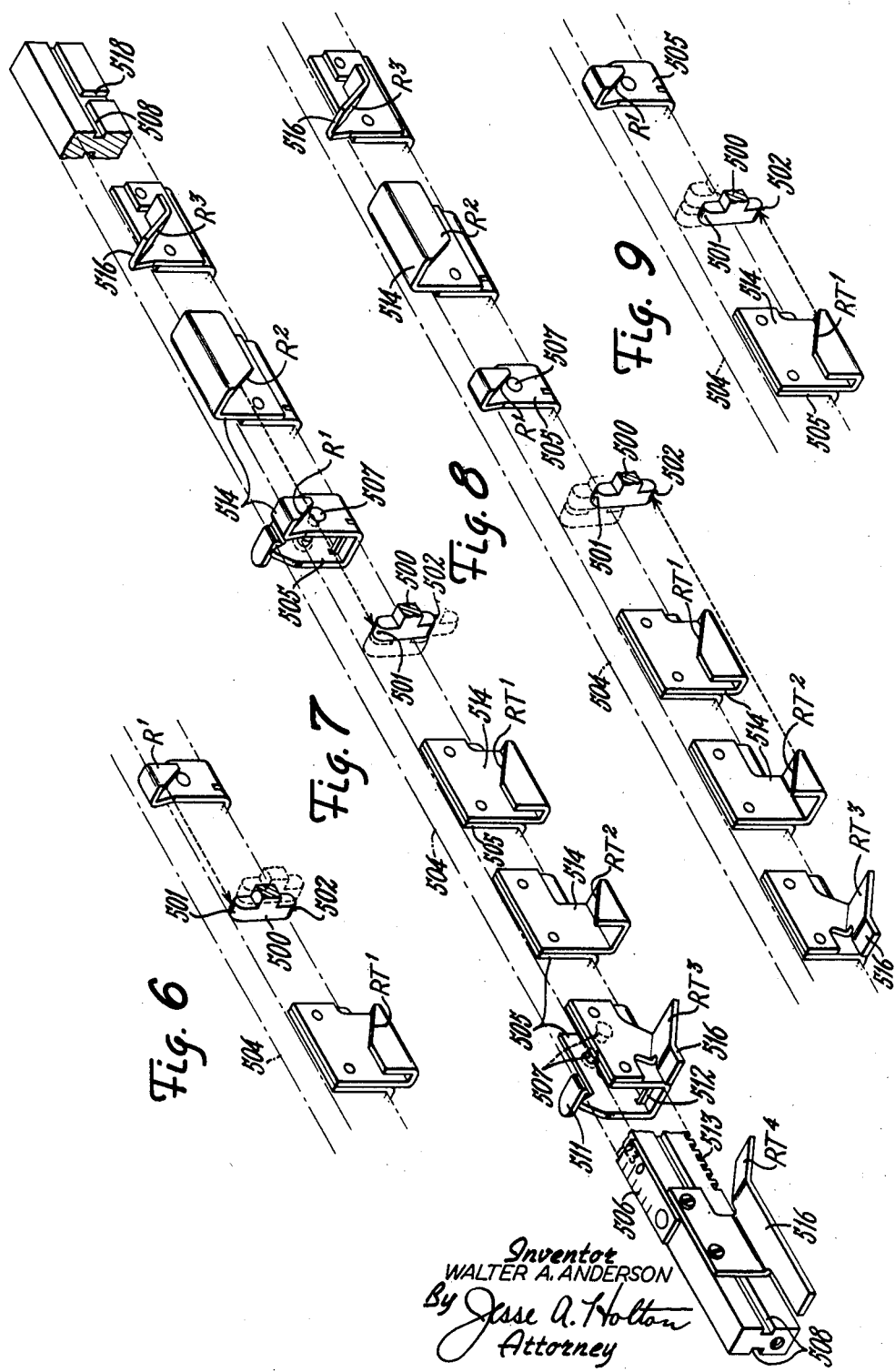

2,630,900

UNITED STATES PATENT OFFICE 2,630,900

AUTOMATIC CARRIAGE RETURN CONTROL

Walter A. Anderson, Bridgeport, Conn., assignor to Underwood Corporation, New York, N. Y., a corporation of Delaware Original application June 27, 1946, Serial No. 679,722, now Patent No. 2,536,524, dated January 2, 1951. Divided and this application December 28, 1949, Serial No. 135,479

2 Claims. (Cl. 197—66)

This invention relates to accounting machines and more particularly to an improvement in power driven carriage return mechanism and controls therefor.

It is one object of the invention to widen the scope of usefulness and increase the flexibility of accounting machines such as the well-known Sundstrand machine.

It is a further object of the invention to provide an improved, simple, economically manufactured carriage returning structure, and particularly also versatile carriage return regulating facilities, capable of being set up and regulated to secure power-return runs over a large number of variable ranges.

Another object is to provide controls for a carriage returning mechanism which may be set to provide a plurality of points for initiation of carriage return and a plurality of points for termination of the initiated carriage return.

Still another object is to devise carriage return and initiating controls which may be selectively rendered effective and ineffective as desired by the operator of the machine.

The invention is illustrated and described as embodied in the well-known Class D Sundstrand Accounting Machine, the main conventional features of which are disclosed in the patents to Sundstrand, Nos. 2,194,270 and 2,209,240, dated respectively, March 19, 1940, and July 23, 1940. Reference to this machine and these patents may be had for clarification of features and details which are not directly part of the present invention, and which it is not deemed necessary to describe and illustrate.

In the accompanying drawings—

Figure 1 is a fragmentary left side elevation showing the carriage return clutch closing and opening mechanism, Figure 2 is a rear elevation of a part of the mechanism of Figure 1 shown with the carriage return clutch engaged.

Figure 3 is a detail view of a part of Figure 2 showing the parts in the position assumed when the carriage return and initiating points are modified, Figure 4 is a view similar to Figure 3 in which the carriage return clutch is in open position, Figure 5 is a rear view showing the parts of Figure 2 in the position assumed when the carriage return clutch is disengaged, Figure 6 is a view of the carriage return controls which are effective when the carriage return controls are manually modified, Figure 7 is a view of all of the carriage return initiating and terminating controls showing their relation to the return clutch operating arm during a tabulating operation, Figure 8 is a view of a part of Figure 7 showing the parts in the positions assumed during a carriage return movement, Figure 9 is a view similar to Figure 6, showing the positions of the parts during return of the carriage by power, Figure 10 is a showing similar to Figure 7 illustrating the manner in which the carriage return point may be manually modified, Figure 11 is a perspective view of the structure shown in Figure 1, and Figure 12 is a perspective view of a detail of Figure 2.

This case is a division of my application, Serial Number 679,722, filed June 27, 1946, now Patent No. 2,536,524 issued January 2, 1951, to which reference may be had for a more complete showing of the accounting machine in which the present invention is embodied.

The present case is directed to mechanism for determining the initial and final return points of a carriage of an accounting machine. Such a carriage is indicated diagrammatically at 2, Figure 1, and comprises a pair of rails 12 and 13 secured to the usual carriage end plates. A wide rail 11 fixed on the base of the machine supports and guides the carriage rails 12 and 13 by balls 14 running in grooves in the adjacent sides of the rails in the usual manner. The carriage 2 is urged to the left by the usual spring drum (not shown) and is arrested in various columnar positions by a tabulating stop, indicated at 18, 27, engaging one of the magazines 20 secured to a plate 21. Plate 21 is secured in the ends of the carriage and carries the magazines 20 which in addition to serving as columnar positioning means may also be loaded with lugs 24 to condition certain controls for the accounting machine as more fully set forth in the aforementioned parent application No. 679,722.

The work-sheet supporting carriage 2 may be caused to return under the power of the same electric motor (not shown) that cycles the machine, and such power returns may be instituted either automatically or under manual control. The carriage return mechanism of the invention is an improvement over the one disclosed in the aforementioned Sundstrand Patent No. 2,194,270, to the end of making possible a much greater selection of carriage return runs, and to the end of providing for improved operation, and particularly also shock and noise reduction.

The return drive will first be described. Referring to Figure 1, a gear 457 is continuously driven in the direction indicated by the arrow 456. The gear 457 is fast on a vertically disposed shaft 458 which supports slidably splined thereon a toothed clutch member 460 for engagement with another toothed clutch member 461 which is part of a gear 462 rotatively loose on the shaft 458. Said clutch members are normally separated as seen in Figures 1 and 5 so that normally no motion is transmitted to the gear 462, which, as seen in Figure 1, is in constant mesh with a carriage return rack 463 carried on the underside of the carriage rail 13. A horizontal shelf 467 forming part of the machine framework supports rotatively the shaft 458 at the bottom, whereas the upper end of the shaft turns in a bearing provided in the rail 11.

The clutch member 460 may be shifted into engagement with the companion clutch member 461 by depression of a carriage return key 468, see Figures 1 and 11. The key 468 is on the forward end of a lever 469 which is pivoted intermediate its ends at 470 and which is urged upwardly to normal position by a spring 472 attached to the lever slightly to the rear of key 468. Well to the rear of the pivot 470, as seen in Figure 1, the lever 469 underlies a horizontal part 471 of a member 473 supported for upward sliding movement on an upright branch of the shelf 467, proper guidance being provided for by shouldered guide-pins 477 fast on said shelf branch and situated in slots 478 of the slide. The aforesaid part 471 reaches into an annular groove 479 in the clutch member 460, and it will thus be seen that operation of the carriage return key 468 results in the meshing of the clutch members 460 and 461 and consequently causes the carriage to be motor driven in the return direction. The slide 473 remains in closed clutch position independently of whether or not the operator withdraws the finger from the key 468, but description of the manner in which this is accomplished will follow later. It will also become evident that carriage returns instituted under the control of the return key 468 are automatically terminated under carriage control.

Drawing now attention to Figures 1 to 5 and 11, means are provided at the rear of the machine to close and open the clutch 460, 461 automatically under carriage control. A stud 480 fixedly supported in a bracket 481, see Figure 1, has rockably supported thereon a unitary structure designated by the general reference numeral 482, and comprising a bail structure consisting of a horizontal arm 484, a vertical leg 485, and connecting web 486. Said unitary structure 482 comprises further a three-armed member 489 having a leg 487 substantially contiguous with the leg 485, and having moreover a horizontal arm 488, the member 489 being riveted fast to the leg 485, as at 491. The said unitary structure 482 includes moreover a stud 493 fast on and projecting forwardly from the arm 484 and operatively connected as at 494 with the vertical slide 473. A third arm 495 of the member 489 has a stiffening connection with the arm 484, and lends more rigidity to the rocking structure 482. The limits to which the entire structure 482 is rockable are established by the opposite ends of the slide slots 476. From the foregoing it will be seen that if the rocking structure 482 is rocked clockwise as seen from the front, it will close the clutch 460, 461. Conversely, it will be seen that if the rocking structure 482 is rocked counterclockwise, the clutch 460, 461 will be opened.

The structure 482 is oppositely rockable under carriage control, and to this end the arm 483 thereof carries a rearward projection 500, having an upreaching lug 501, and also a downreaching lug 502, such lugs being respectively engagable for downward and upward displacement by return instituting elements $R^1$, $R^2$, $R^3$, and return terminating elements $RT^1$, $RT^2$, $RT^3$ and $RT^4$, see Figures 6 to 10, inclusive. The elements $R^1$, $R^2$, $RT^1$ and $RT^2$ lie in individual traveling paths, and as can be seen in Figures 7 and 8, the elements $R^2$ and $RT^2$ are normally cooperatively associated with the rocker lugs 501 and 502 for opposite clutch controlling operation to the exclusion of the elements $R^1$ and $RT^1$. In order to associate the lugs 501, 502 respectively with the elements $R^1$ and $RT^1$, the rocking structure is mounted upon the stud 480 for rearward sliding movement, to position the lugs in vertical registration with these elements, as indicated in full lines in Figures 6 and 9.

The control elements $R^1$, $R^2$, $RT^1$ and $RT^2$ are preferably carried on a single supporting bar 504 extending lengthwise of the carriage and fixed to the carriage ends, the bar having a scale 506 overlying it. Preferably each control element is part of an individual body and each such body may comprise a channel member 505, clearly illustrated in Figure 7 in connection with the element $RT^3$, and fitting the bar 504 around the front, back and bottom for sliding adjustment therealong, the various channel members 505 being each equipped with pins 507 that reach towards each other into grooves 508 provided along the front and rear of the bar 504. Each adjustable body includes, moreover, a releasable detent in the form of a slide 511 having a tooth 512 for locking engagement in rack-forming notches 513 of the bar 504. The return instituting elements $R^1$ and $R^2$ and the return terminating elements $RT^1$ and $RT^2$ reach respectively towards each other transversely of the carriage and form each a part of a U-shaped plate 514 that is riveted to or integral with the channel bodies 505. The plates 514 are formed so that the elements $R^1$ and $R^2$ and the elements $RT^1$ and $RT^2$ lie in the aforesaid individual traveling or controlling paths. The elements $R^3$, $RT^3$ and $RT^4$ have preferably wide camming shelves 516 so that they are in controlling association with the rocker 482 in both the forward and the rearward position of the latter. The final return terminating element $RT^4$ is to insure opening of the return drive as the carriage reaches the extreme of possible travel in return direction. It is similar to the element $RT^3$ but, as there is no need to adjust it, it is fixed directly to the bar 504.

The various bodies 505 carrying the control elements are applicable to and adjustable on the bar 504 to any position therealong, and in any desirable order or combination which may include several control elements of the same form. To render the bodies readily applicable and removable, the bar 504 has at the front and rear, at one or both carriage ends, transverse grooves 518, see right end of Figure 7, merging into the longitudinal grooves 508, the grooves 518 constituting entrance and exit clearance for the pins 507.

It will be perceived from Figures 6 to 10, inclusive, that the return instituting elements $R^1$, $R^2$ and $R^3$ are formed for camming engagement with the lug 501 to cam the latter downwardly during advance travel of the carriage, and that the control elements RT¹, RT² and RT³ and RT⁴ are formed to displace the lug 502 upwardly during return travel of the carriage. Thus with the rocker 482 in forward position, as in Figure 7, a carriage return will ensue when the element R² rides over the lug 501 and depresses it. The lug 502 is consequently depressed so that it is in the path of the element RT² as depicted in Figure 8. Thereafter when the control element RT² after institution of a carriage return engages and displaces the lug 502 upwardly, the carriage return clutch will be opened again, the carriage settling or advancing thereafter to a columnar position defined by one of the usual columnar control dogs on the carriage. When the rocking structure 482 is shifted to the rear as depicted in Figures 6 and 9, the carriage return clutch 460, 461 is similarly controlled to close in response to engagement of the return instituting element R¹ with the lug 501, and is similarly controlled to open during the ensuing return, by the engagement of the return terminating stop RT¹ with the lug 502.

Detenting means are provided to hold the rocking structure 482 in either of its two rocked positions. Moreover, said detent means are constructed to throw the rocking structure slightly beyond the opposite positions to which the return instituting and return terminating elements are capable of displacing it. This provides for clear passage of the control elements R¹, R² and the elements RT¹, RT², RT³ when the clutch has been respectively closed and opened.

It is thus evident that the control elements allow overtravel of the carriage beyond the return instituting and the return terminating positions. Thus at any return institution the carriage is brought to a stop and is reversed by the return driving mechanism, such reversal being cushioned by means of a shock absorbing mechanism (not shown herein), and being substantially shockless and noiseless. The reversal of carriage motion at the end of the return is also smoothly accomplished in that the carriage merely outruns its momentum against the usual carriage feed spring, and then settles back to the proper columnar position against the conventional columnar control dogs 20 on the carriage 2, the settling-back movement being insufficient to bring that return terminating element which was just active below the lug 502. This allows reengagement of the clutch 460, 461. The carriage return instituting elements are usually arranged to function as the carriage is tabulated out of a column defined by one of the columnar control dogs 20.

Referring to Figures 1 and 11 in which the rocking structure 482 is shown in normal, forward position, a detent arm 520 pivoted on a stud 521 fixed in plate 481 has an upreaching angled nose 522 having, as seen from the rear, see Figures 2 to 5, a left face contacting a right face 485a of an angled nose on the lower part of the arm 485 of the rocking structure. The detent arm 520 has a bail extension 524 giving it more stable pivotal support on the stud 521, and collars 526 locate it on the stud 521. A spring 525 constantly urges the detenting nose 522 upwardly. When the clutch is closed, either by actuation of the carriage return key 468, or under control of one of the return instituting elements R¹, R², or R³, the detent nose 522 is displaced downwardly by the face 485a and will thereafter snap upwardly to engage a left face 485b of said angled nose, as shown in Figure 2, it being understood that the tension of the detent 520 forces the structure 482 to complete the rocking motion.

When it is desired to place the clutch controlling rocker 482 into the controlling paths in which the elements R¹ and RT¹ lie, a key 527 is depressed, see Figure 11. This key 527, although marked Shuttle Key in the drawings, serves a much broader purpose than this name implies, and may be more properly named Return Control Modifier. The key 527 is provided on the front-end of a lever 528 that is fast on a pivoted shaft 529 having at the left a downreaching arm 531. An arm 533, loosely pendent from a shaft in the machine, carries a pin 534 which reaches to one side of arm 533 in front of the arm 531, and to the other side into a slot 535 in a rearwardly extending link 536, the pin 534 having a retainer head for the link. At the rear, the link 536 is supported for sliding movement in the frame, in a manner not shown, and has a rightward reach 537 into a notch in the clutch shifting stud 493 of the rocker 482. A light spring 540, shown in Figure 11, constantly urges the arm 533 rearwardly, and thereby also the rocker 482. A relatively stronger spring 541 associated with the key lever 528 is capable of overcoming the spring 540, so that if the key lever 528 is in forward position, spring 541 is either tending to move or is keeping the rocking structure 482 in forward position through the tension of a spring 542 resiliently connecting the arm 533 with the link 536. The normal position of the lever 528, and also the arm 533, is established by a frame-supported pin 544. Operation of the key 527 results in a rearward displacement of the link 536, through the action of spring 540, and thus results also in rearward displacement of the rocker 482. Assuming that the rocker 482 at the time of operation of the key 527 is in an open-clutch position, as shown in the side view of Figure 1 and in the rear view of Figure 5, the angled detent nose 522 will as a result of such key operation snap from the face 485a upwardly to engage a face 487a on the lower end of the arm 487, see Figure 4, the face 487a being upwardly offset a little from the face 485a to provide a catch shoulder. The arm 487 has similarly a face 487b which is upwardly offset from the face 485b, for the detent to catch therebehind. It will thus be seen that if rearward shift of the rocker 482 is effected with the same in open-clutch position as seen in Figure 5, the lugs 501 and 502, as illustrated in Figures 6 and 9, will become associated for opposite operation by any return instituting and return terminating control element which respectively lies in the same paths as the elements R¹ and RT¹.

Directing attention temporarily to Figure 12, the angled nose of arm 485 is recessed at the right side thereof to form a slight rearward extension 547 of the face 487b, this extension providing a catching shoulder 550, and forming a ridge or apex 548 at the juncture with the left face 485a. Whenever after operation of the shuttle key 527 a return has been instituted, either by depression of the carriage return key 468 or under control of one of the return instituting elements, the left face of the detent nose 522 will come to lie in front of the shoulder 550, against the right face 487b, see the rear view Figure 3. Provided that the operator releases the shuttle key 527 before conclusion of the return, the rocker will be moved slightly to the front by the spring 542 until the rear of the detent nose 522 is contacted by the shoulder 550. During the ensuing carriage return any one of the return terminating elements $RT^1$, $RT^3$ or $RT^4$ that may engage the lug 502 will rock the structure 482 to open-clutch position. If at this time the key 527 is in normal position, the ridge 522 will ride over the point of the detent nose 548 and the rocker will consequently reassume its normal forward position of Figure 11 under the tension of the spring 542.

Whenever at the end of a power return with the rocker in rearward position it is desired to keep the rocker in such rearward position, it is merely required to operate the shuttle key 527 as the power return is being automatically concluded. This will cause the detent nose to slide again onto the face 487a, as in Figure 4, to retain the rocker in rearward position. It is possible also to shift the rocker rearwardly from normal position at any time during an instituted power return, thereby to cause termination of such return by one of the terminating elements in the rear path.

Innumerable carriage returns of different extents and of different ranges may be obtained by use of various arrangements and different positional combinations of the aforedescribed return instituting and terminating elements. This is particularly true in view of the carriage return key 468 and the shuttle or return modifier key 527. Some examples of arrangement will be related merely to demonstrate the versatility of the described carriage return mechanism.

In the control-element organization shown in Figure 7, the normal range of carriage advance and return travel is governed by the return instituting element $R^2$ and the return terminating element $RT^2$. If after a return termination of the carriage under control of the stop $RT^2$, in the manner illustrated in Figure 8, it is desired to extend the return, the operator need merely depress the carriage return key 468. It is to be understood that the momentum of the carriage carries the carriage considerably beyond the active return terminating element, and that the columnar dog 20 on the carriage 2 is so related to it as to arrest the carriage before the carriage 2 has dropped back sufficiently to block clutch closing. The extended return will then be terminated by the element $RT^3$. The same operation may be repeated to extend the return still further to the final return terminating stop $RT^4$. To bring the return instituting element $R^1$ and the return terminating element $RT^1$ into use, the operator may depress the return control modifier key 527 while the carriage is in such a position that the rocker lugs 501 and 502 are intermediate the elements $R^1$, $RT^1$, as in Figures 6 and 9. Or, the modifier key may be depressed while the control element $R^1$ is to the right of the lugs 501, 502. The rocker will automatically restore to its forward position upon the first termination of the return by the element $RT^1$, but if it is desired to stay within the range of the elements $R^1$, $RT^1$, the operator need merely depress the shuttle key 527, at the time of or after the return termination, this causing the rocker to be latched in rearward position. Having operated the shuttle key as stated it is subsequently possible to extend the return by operation of the return key 468 for termination by the element $RT^3$. The return may be further extended by again operating the key 468. A return run terminated by the element $RT^1$ and having caused the rocker to reassume normal forward position, can also be repeatedly extended by depression of the return key 468.

The carriage advance travel may be extended beyond the element $R^2$. To do so the operator operates the shuttle key 527 while the rocker lugs 501, 502, as depicted in Figure 10, are past the element $R^1$, but are not yet in contact with the element $R^2$. This will put the lug 501 into the rear path, for the element $R^2$ to bypass during further carriage advance and for engagement by the return instituting element $R^3$ at such further advance. Subsequently when a return run is instituted, by the carriage return key 468 or by the element $R^3$, the lug 501 will have free passage past the return instituting element $R^1$. This is because closure of the carriage return clutch positions lug 501 below and clear of any return instituting element. It is possible at any time also to operate the carriage return key 468 and the shuttle key 527 while the element $R^1$ is to the left or in front of the lug 501.

It is thus evident that with the illustrated arrangement many divergent requirements can be filled.

Obviously, if desired, several of the return terminating elements $R^1$ may be provided in advance, that is to the left of the element $R^2$, and the power return mechanism may be made potentially responsive to any of such several elements by judiciously depressing the shuttle key 527 in selected carriage positions. Also here, under no circumstances will any of the elements $R^1$ interfere with return travel of the carriage.

Wherever the work may make it desirable, the control elements can be arranged to give a short normal range and a long abnormal range.

The control elements may be arranged to give adjacent or overlapping ranges of carriage travel. For example, the elements may be arranged in the following order from left to right: $RT^1$, $RT^2$, $R^1$, and $R^2$ and possibly with other desired elements flanking these. In this arrangement it is possible to switch the rocker 482 from the front to the rear position to get into the range of the elements $R^1$ and $RT^1$. To provide for advance of the carriage beyond the element $R^2$, the operator merely shifts the rocker to the rear after passing the element $R^1$. In such a setup the elements $R^1$ and $RT^2$ obviously allow respectively free return and advance travel of the carriage.

The above examples of arrangement of the return control elements are, of course, only exemplary and the different actual arrangements possible are practically unlimited.

The shuttle key 527 may have associated therewith other mechanism as set forth in connection with the shuttle key in Patent No. 2,194,270. For instance, at the time the shuttle key 527 is operated the carriage is usually standing in a certain columnar position, and it is usually desired to cycle the machine and tabulate the carriage. Accordingly, see Figure 11, the shuttle key 527 may actuate, as in the patent, a pin 552 which is carried for pivotal movement about the shaft 529 by an arm 553, the pin 552 being in communication with a lever 554 that is associated with the cycle-tripping mechanism disclosed in said patent. Moreover, if desired, said shuttle key 527, through actuation of the arm 553, as in said patent, may render the line-spacing mechanism effective for operation during the ensuing machine cycle. A key-lock for the shuttle key 527 may also be optionally provided.

This invention is susceptible of modification and change without departure from the spirit of the invention and the above description is set forth as a preferred embodiment thereof and is not to be taken as limiting the scope of the following claims to the details thereof.

What is claimed is:

1. In an accounting machine having a carriage advanceable and returnable on a frame, a normally disengaged carriage return drive, a rockable and shiftable drive engaging and disengaging member, manual means to shift said member from a first control position to a second control position and a detent to hold said member in any rocked or shifted position, said detent and said member being so shaped as to permit automatic restoration of said member from said second control position to said first control position upon a rocking and return movement of said member, the combination of a support on said carriage, a plurality of cams thereon in two rows, a cam engaging projection on said member operable by said cams when said member is in said first control position to rock said member to engage and disengage said carriage return drive, said projection in either rocked position of said member being engageable only by the cams which are effective to reverse the condition of the carriage return drive, and a second plurality of cams on said support in two other rows displaced from said first two rows by the amount of and in the direction of the shifting movement of said member for operating said member in its manually shifted position, said cam engaging projection being so formed as to be engageable only by the cams of one row at any time.

2. In an accounting machine having a carriage advanceable and returnable on a frame, a normally disengaged carriage return drive, a rockable and shiftable drive engaging and disengaging member, manual means to shift said member from a first control position to a second control position and a detent to hold said member in any rocked or shifted position, said detent and said member being so shaped as to permit automatic restoration of said member from said second control position to said first control position upon a rocking and return movement of said member, the combination of a support on said carriage, a plurality of cams adjustably mounted thereon, a projection on said member to be engaged by said cams in said first control position of said member to engage or disengage said carriage return drive, said projection in any rocked position of said member being engageable only by the cams of said plurality which will reverse the condition of said carriage return drive, and a second plurality of cams on said support, to engage said projection and control said drive when said member is in its shifted position, the cams of said first plurality being connected to said support by parts outside of an area effective to engage said projection, and said projection being so formed as to enable the cams of the non-selected plurality to pass idly by said projection during carriage movements.

WALTER A. ANDERSON.

REFERENCES CITED

The following references are of record in the file of this patent:

UNITED STATES PATENTS

| Number | Name | Date |
| --- | --- | --- |
| 1,901,135 | Sundstrand | Mar. 14, 1933 |
| 2,216,634 | Sundstrand | Oct. 1, 1940 |
| 2,251,096 | Anderson | July 29, 1941 |
| 2,348,048 | Anderson | May 2, 1944 |